US012090382B1

(12) United States Patent
Goins

(10) Patent No.: US 12,090,382 B1
(45) Date of Patent: Sep. 17, 2024

(54) TRAINING DEVICE TO ENHANCE SWING LAG

(71) Applicant: Goins Enterprises, LLC, Pinehurst, NC (US)

(72) Inventor: Donnie Lee Goins, Pinehurst, NC (US)

(73) Assignee: GOINS ENTERPRISES, LLC, Pinehurst, NC (US)

( * ) Notice: Subject to any disclaimer, the term of this patent is extended or adjusted under 35 U.S.C. 154(b) by 0 days.

(21) Appl. No.: 18/381,841

(22) Filed: Oct. 19, 2023

Related U.S. Application Data

(63) Continuation-in-part of application No. 18/116,640, filed on Mar. 2, 2023, now Pat. No. 11,794,085.

(51) Int. Cl.
A63B 69/36 (2006.01)
A63B 69/00 (2006.01)
A63B 71/06 (2006.01)
A63B 102/18 (2015.01)
G09B 19/00 (2006.01)

(52) U.S. Cl.
CPC ...... *A63B 69/3608* (2013.01); *A63B 69/0002* (2013.01); *A63B 71/0622* (2013.01); *A63B 2069/0008* (2013.01); *A63B 2071/0625* (2013.01); *A63B 2102/18* (2015.10); *A63B 2214/00* (2020.08); *G09B 19/003* (2013.01)

(58) Field of Classification Search
CPC ............ A63B 69/3608; A63B 69/0002; A63B 71/0622; A63B 2069/0008; A63B 2071/0625; A63B 2102/18; A63B 2214/00; G09B 19/003

USPC ........ 473/207, 208, 212–217, 226–229, 266, 473/276
See application file for complete search history.

(56) References Cited

U.S. PATENT DOCUMENTS

| 5,082,283 | A | | 1/1992 | Conley | |
|---|---|---|---|---|---|
| 5,174,575 | A | * | 12/1992 | Leith | A63B 69/0059 473/227 |
| 5,470,072 | A | | 11/1995 | Cunningham | |
| 6,863,616 | B2 | * | 3/2005 | Snyder | A63B 69/3608 473/214 |
| 7,156,748 | B2 | * | 1/2007 | Burke | A63B 69/0059 473/226 |
| 7,285,055 | B2 | | 10/2007 | Radle | |
| 8,043,162 | B2 | | 10/2011 | Sery | |
| 8,109,816 | B1 | | 2/2012 | Grober | |
| 9,555,303 | B1 | | 1/2017 | Novosel, Sr. | |
| 9,802,095 | B1 | * | 10/2017 | Boyer | A63B 21/4017 |

(Continued)

*Primary Examiner* — Nini F Legesse
(74) *Attorney, Agent, or Firm* — Kevin E Flynn; FLYNN IP LAW

(57) ABSTRACT

A swing lag training device having a collar for reversible attachment to a shaft near a golf club head; an arm band for attachment above an elbow of an arm of a user; a spooling device attached to the arm band with a cord that connects the spooling device to an attachment port near the golf club head; the spooling device adapted to: 1) retract cord into the spooling device during a back swing; and 2) provide a set of audible sounds as cord is unwound as the golf club head is moved in a forward swing so that a user can train to concentrate the set of audible sounds in a late portion of in the forward swing and thus maintain swing lag during an early portion of the forward swing. The training device can be adapted for training to swing other implements beyond golf clubs.

21 Claims, 18 Drawing Sheets

(56) References Cited

U.S. PATENT DOCUMENTS

| | | |
|---|---|---|
| 11,794,085 B1 * | 10/2023 | Goins ................ A63B 69/3608 |
| 2001/0021674 A1 | 9/2001 | Takase |
| 2004/0097296 A1 | 5/2004 | Snyder |
| 2009/0239686 A1 | 9/2009 | Moos |
| 2009/0258734 A1 | 10/2009 | Souders |
| 2009/0325724 A1 | 12/2009 | Cayse |
| 2012/0178545 A1 | 7/2012 | Bowlby |
| 2017/0259146 A1 * | 9/2017 | Jewett ................ A63B 69/3608 |

* cited by examiner

200

204

400

800

800

TRAINING DEVICE TO ENHANCE SWING LAG

BACKGROUND

This application claims priority to co-pending and commonly assigned U.S. patent application Ser. No. 18/116,640 for Training Device to Enhance Swing Lag. The '640 application is incorporated by reference in its entirety.

FIELD OF THE DISCLOSURE

This disclosure relates generally to training aids for use in improving a swing of a stick-like object that is held by a user with two hands. This would include a golf club but could include many other objects such as a baseball bat, softball bat, a hockey stick, a lacrosse stick, and other items used in sports. This tool may help train users who use items swung by the users such as a scythe or an axe so as to increase the force applied at the intended point of contact. The tool could be something other than a scythe or an axe but is another tool that is used to apply impact to a work piece to alter the work piece just as an axe alters the wood at the point of contact. Within the field of golf, this training aid would be said to increase swing lag. The training aid may also be used to improve a one-handed swing.

RELATED ART

The present disclosure addresses a way to increase swing lag within a swing such as a golf swing. Before going into the specific teachings of this disclosure, it is useful to clarify what is meant by the term swing lag.

Within the field of golf, it is understood that swing lag is a desirable attribute of a golf swing. When a golfer swings a golf club 100 (FIG. 1) to strike a golf ball, there are three major components to the swing. There is a backswing, a forward swing, and a follow through after contact with the ball. During the backswing, the forearm 154 of the leading arm 120 is moved from substantially vertical relative to the ground to tilted beyond horizontal with the hand above the elbow. The trailing arm 130 also moves from substantially vertical along with the leading arm 120.

As illustrated in FIG. 1, the golf club shaft 104 of the golf club 100 is not aligned with the forearm 154 at the end of the backswing. The golf club shaft 104 is substantially perpendicular relative to the forearm 154. For some golfers, the golf club shaft 104 may be swung beyond perpendicular relative to the forearm 154. The deviation of the golf club shaft 104 from an extension 160 of the forearm 154 is called swing lag 140. It is known in the art that maintaining swing lag 140 during an early portion of the forward swing improves the overall quality of the golf swing. Note, that while the swing lag 140 shown in FIG. 1 is close to 90 degrees, swing lag can be more than 90 degrees. Swing lags of 100 or 120 degrees are present in some golfers.

FIG. 2 shows an early portion of the forward swing. FIG. 2 illustrates the maintenance of swing lag 140 as the golf club shaft 104 of the golf club 100 is not aligned with the forearm 154 of the leading arm 120 even as the forearm 154 approaches vertical (at least in the plane shown in this figure).

FIG. 3 shows the end of a late portion of a forward swing where the swing lag 140 is eliminated as the golf club shaft 104 is now substantially aligned with leading forearm 154 and the golf club head 108 is ready for impact with the ball (not shown). To introduce terms that will be useful later, note that FIG. 3 shows trailing arm 130 with forearm 134, elbow 136, and upper arm 138.

VOCABULARY

A, An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Gne and Gnes.

To avoid the awkward he/she and his/her or the potentially confusing singular use of they and their, this application uses the gender-neutral pronoun—gne, the possessive pronoun—gnes, the reflexive pronoun—gneself and the object form—gnerm.

Or.

Unless explicit to the contrary, the word "or" should be interpreted as an inclusive or rather than an exclusive or. Thus, the default meaning of or should be the same as the more awkward and/or.

Proximal and Distal.

Proximal and distal should be considered relative to the user's hands. Thus on a golf club, the grip would be proximal and the club head would be distal.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for the purposes of this industrial process it is X. So something that may not be absolutely parallel but is for all practical purposes parallel, is substantially parallel. Likewise, mixed air that has substantially uniform temperature would have temperature deviations that are inconsequential for that industrial process.

As recognized in C. E. Equipment Co. v. United States, 13 U.S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

SUMMARY OF THE DISCLOSURE

Aspects of the teachings contained within this disclosure are addressed in the claims submitted with this application upon filing. Rather than adding redundant restatements of all of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Some aspects of the teachings of the present disclosure may be expressed as a training device to help develop swing lag for a golf swing, the training device with:

a collar with an attachment port for reversible attachment to a golf club shaft of a golf club so that the collar does not allow relative motion between a reversibly attached collar and the golf club shaft;

an arm band for attachment above an elbow of an arm of a user;

a spooling device attached to the arm band with a cord that connects the spooling device to the attachment port on the golf club shaft.

The spooling device adapted to:

retract cord into the spooling device as a golf club head is moved during a back swing and a distance between the attachment port and the spooling device is decreased; and provide a set of audible sounds as cord is unwound from the spooling device as the golf club head is moved in a forward swing after the back swing so that a user can train to concentrate the set of audible sounds in a late portion of the forward swing as the golf club head approaches an end of the forward swing and thus maintain swing lag during an early portion of the forward swing in order to increase leverage during impact of the golf club head with a golf ball later in the forward swing.

Some aspects of the teachings of the present disclosure may be expressed as a method of working to enhance swing lag for a golf stroke by using a golf club shaft of a golf club with an attached latching mechanism with a rotating collar. the method including:

attaching an arm band to an upper arm of a user wherein the arm band has a spooling device attached to the arm band, with a first end of a cord attached to the spooling device and a distal end of the cord that is moveable relative to the spooling device such that a spool within the spooling device releases cord as the distal end of the cord moves away from the spooling device and retracts cord as the distal end of the cord moves towards the spooling device; and wherein the arm band is positioned so that the cord can extend from the spooling device towards a portion of ground in front of the user;

attaching the distal end of the cord to an attachment port on the rotating collar;

assuming a position suitable to strike a ball with a club head at an end of a forward swing;

executing a backswing of the golf club including rotating the golf club shaft relative to a forearm of a leading arm to induce swing lag; wherein a distance between the attachment port on the rotating collar and the spooling device is decreased and the spooling device winds in a portion of the cord;

initiating a forward swing while working to maintain the swing lag during an early portion of the forward swing by avoiding audible indications of portions of cord being extended from the spooling device; and completing the forward swing and rotating the golf club shaft to eliminate the swing lag and thus add to a velocity of a golf club head of the golf club at an end of the forward swing.

Some aspects of the teachings of the present disclosure may be expressed as a training device to help develop swing lag for swinging an implement, the implement having a proximal end held with at least one hand and a distal end, opposite the proximal end, the training device having:

a latching mechanism for reversible attachment to the implement so that the latching mechanism does not allow relative motion between a reversibly attached latching mechanism and the implement;

a means for allowing a connection point to rotate relative to the reversibly attached latching mechanism and thus allows the connection point to rotate at least partially around the implement;

an arm band for attachment above an elbow on an arm of a user;

a spooling device attached to the arm band with a cord that connects the spooling device to the connection point near the distal end of the implement;

The spooling device adapted to:

retract cord into the spooling device as the distal end of the implement is moved during a back swing and a distance between the connection point and the spooling device is decreased; and provide a set of audible sounds as cord is unwound from the spooling device as the distal end of the implement is moved in a forward swing after the back swing so that a user can train to concentrate the set of audible sounds in a late portion of in the forward swing as the distal end of the implement approaches an end of the forward swing and thus maintain swing lag during an early portion of the forward swing in order to increase leverage during impact of the distal end of the implement later in the forward swing.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 4:
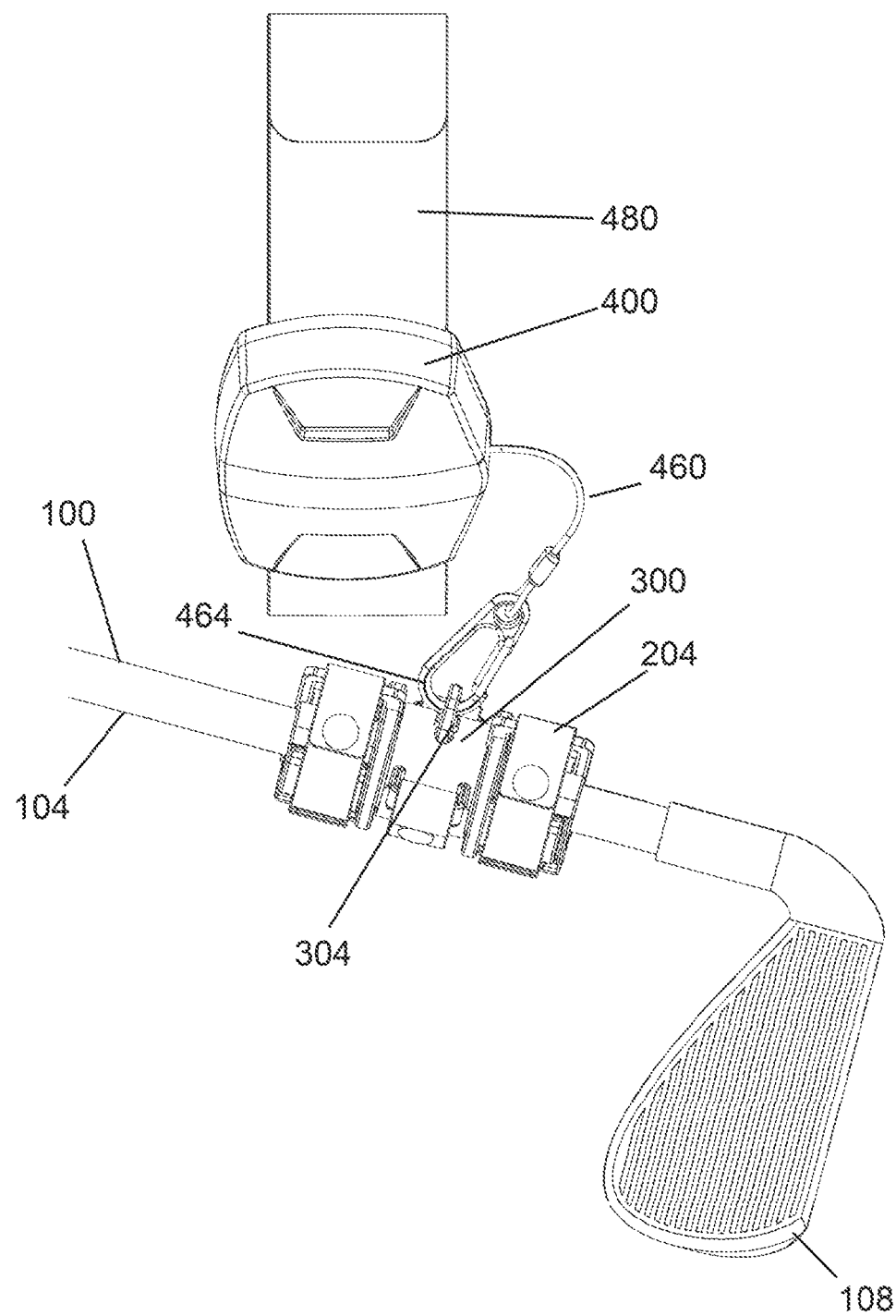
FIG. 4 is a view that captures the front side of the golf club head 108 and a front side of the spooling device 400.

FIG. 4 introduces the components of interest for the current disclosure with a view that captures the front side of the golf club head 108 and a front side of the spooling device 400.

Figure 5:
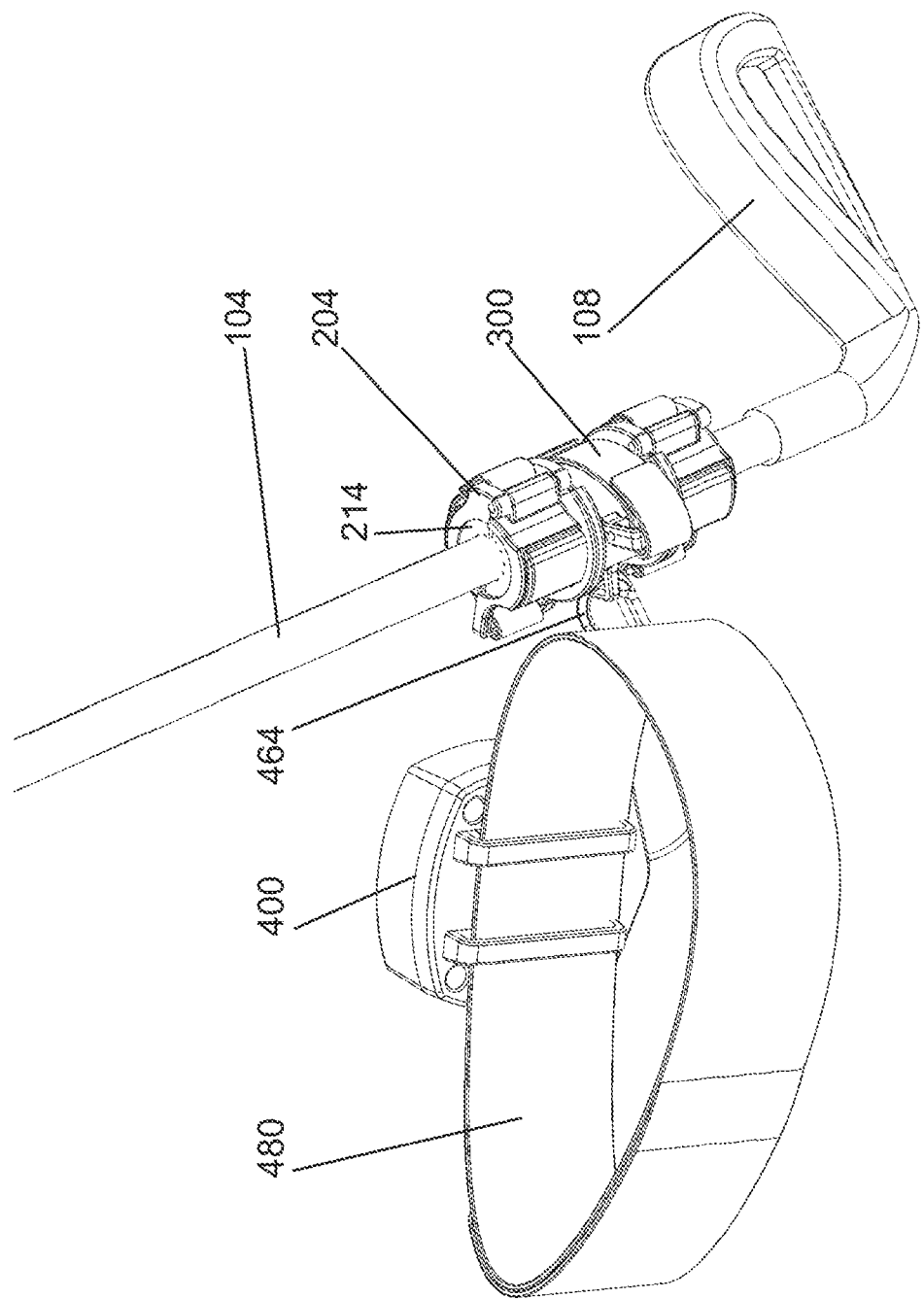
FIG. 5 is a top side, back side perspective view of golf club head 108 and spooling device 400.

FIG. 5 shows another view of the same components. FIG. 5 is a top side, back side perspective view of golf club head 108 and spooling device 400. FIG. 4 and FIG. 5 do not show the entire golf club shaft 104 so as to enlarge the elements of interest.

Training device 200 has a latching mechanism 204 that is used to connect the training device 200 to a golf club 100 on a golf club shaft 104 near a golf club head 108. The latching mechanism 204 is adapted to reversibly connect to the golf club shaft 104 so that there is not relative movement of the latching mechanism 204 relative to the golf club shaft 104 after the reversible attachment. The latching mechanism 204 is adapted to be reversibly connected to the golf club shaft 104 without damaging the golf club shaft 104 as the points of contact between the latching mechanism 204 and the golf club shaft 104 are pliable and conform around the golf club shaft 104 while under compression but do not harm the golf club shaft 104. One of skill in the art will appreciate that other means may be used to protect the golf club shaft from the latching mechanism including applying a protective sleeve or pads to the golf club shaft before applying the latching mechanism.

Training device 200 has a rotating collar 300 that fits on the latching mechanism 204 after reversible engagement with the golf club shaft 104. Rotating collar 300 has an attachment port 304 which receives a distal end 464 of a cord 460. The distal end 464 of the cord 460 may be a carabiner, some other reversible attachment device such as a key ring, or may be simply an end of the cord that is engaged with the attachment port via a reversible knot.

Figure 1:
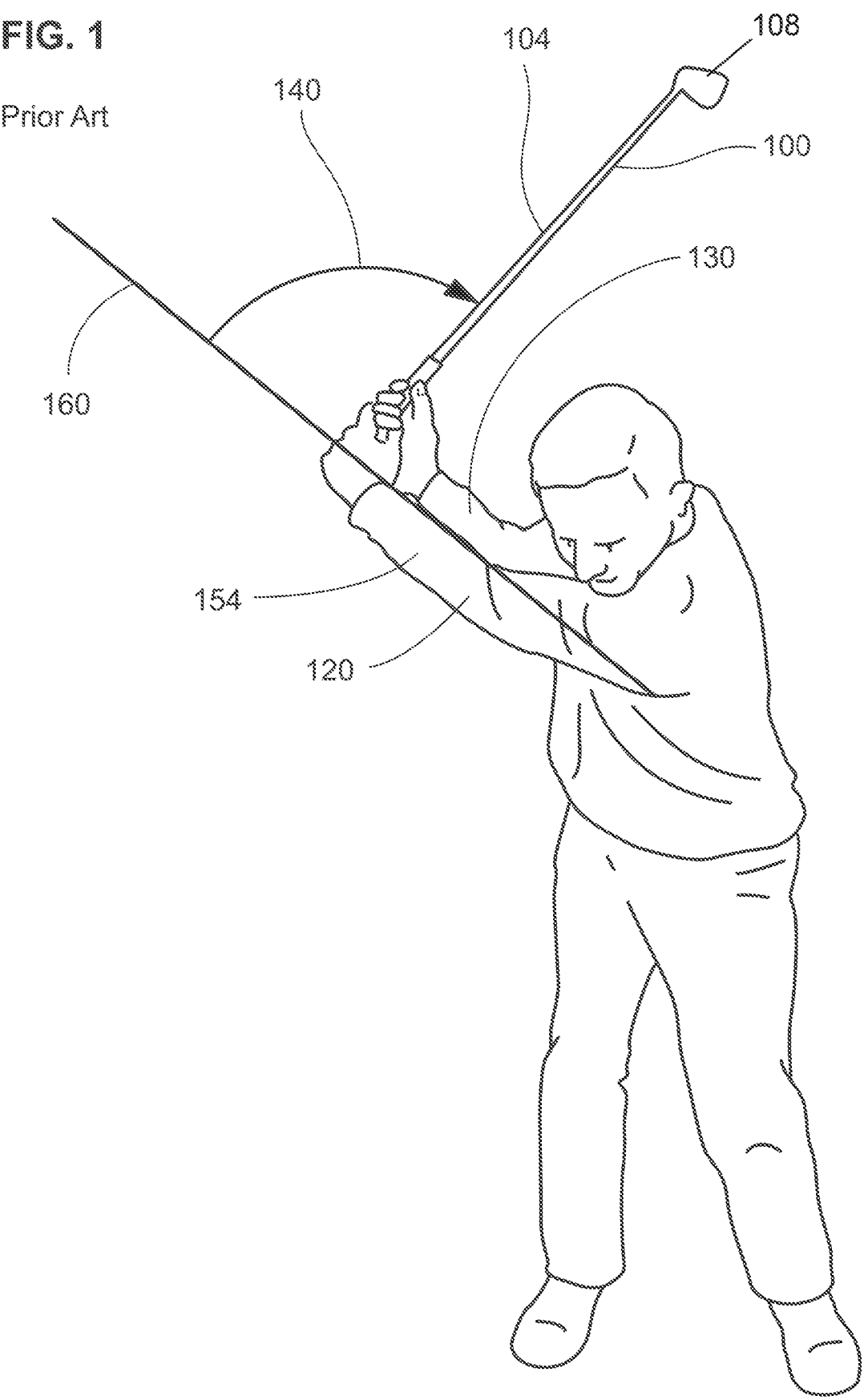
FIG. 1 shows a golfer with a golf club at the end of the backswing in order to introduce the concept of swing lag.
Figure 2:
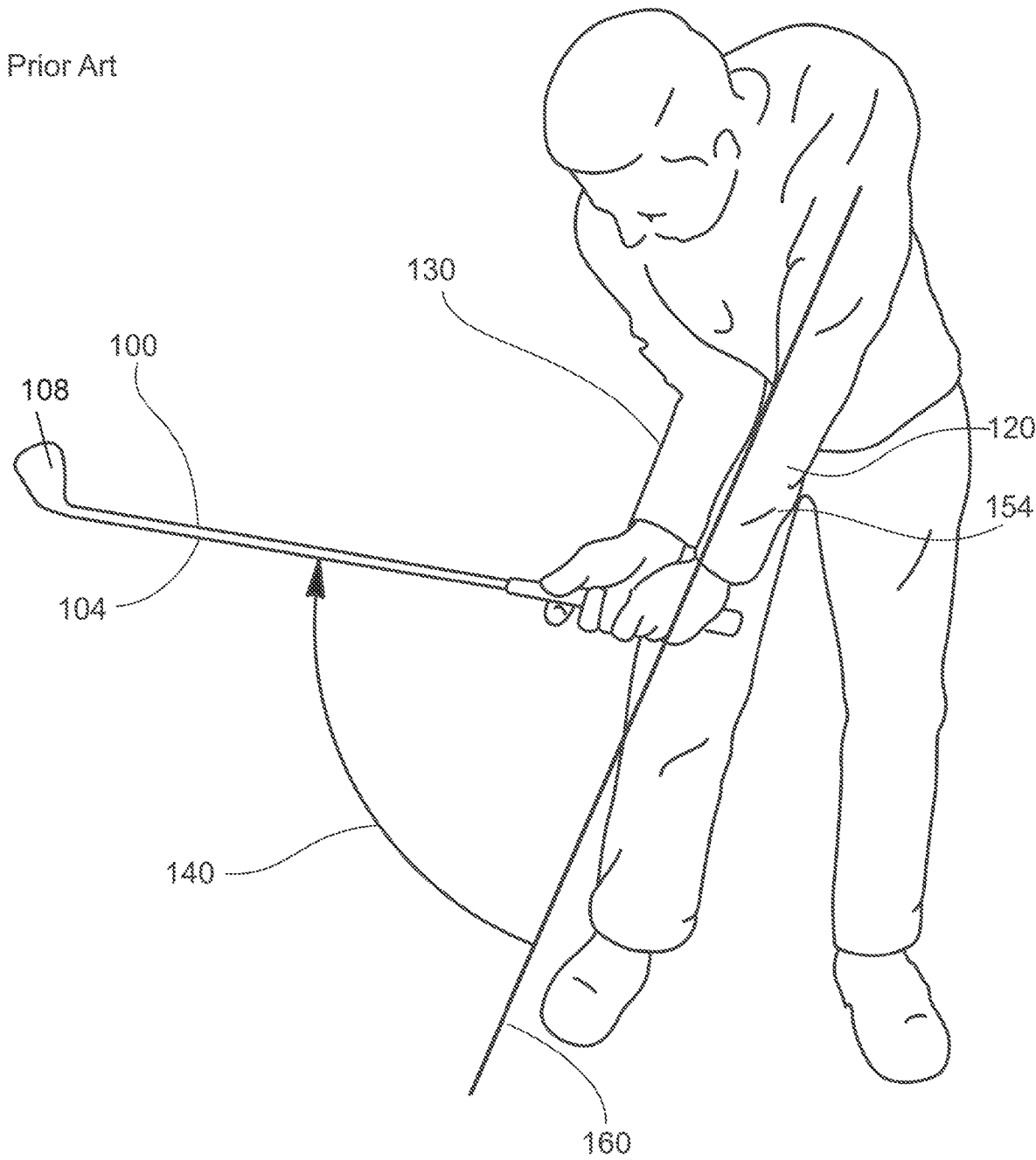
FIG. 2 shows an early portion of the forward swing.

Training device has a spooling device 400 which is attached to arm band 480. Arm band 480 is sized for reversible attachment to a user's arm above the elbow. The spooling device 400 has one end of cord 460 which is under tension to decrease the length of cord extended from spooling device 400. Thus when a user brings the golf club 100 back during a backswing and introduces swing lag 140 (FIG. 1) between the golf club shaft 104 and the forearm 154 (FIG. 1) on the leading arm of the user, the spooling device 400 retracts a length of cord 460 as the distance between the attachment port 304 on the rotating collar 300 and the spooling device 400 decreases during a backswing that introduces lag angle to form swing lag 140.

Spooling device 400 is adapted to issue audible sounds as a length of cord 460 is extended from the spooling device 400. The spooling device 400 may also issue audible sounds as the length of cord 460 is retracted into the spooling device 400 during the backswing. As a non-limiting example, one prototype issued an audible click with each extension of a half inch of cord 460 being extended from spooling device 400. A user motivated to retain swing lag during the early portion of the forward swing can use feedback from the click sound to retard the occurrence of the first click heard during the forward swing and can seek to minimize the number of clicks heard before the forearm 154 of the lead arm 120 has moved downward past being parallel to the ground.

Figure 6:
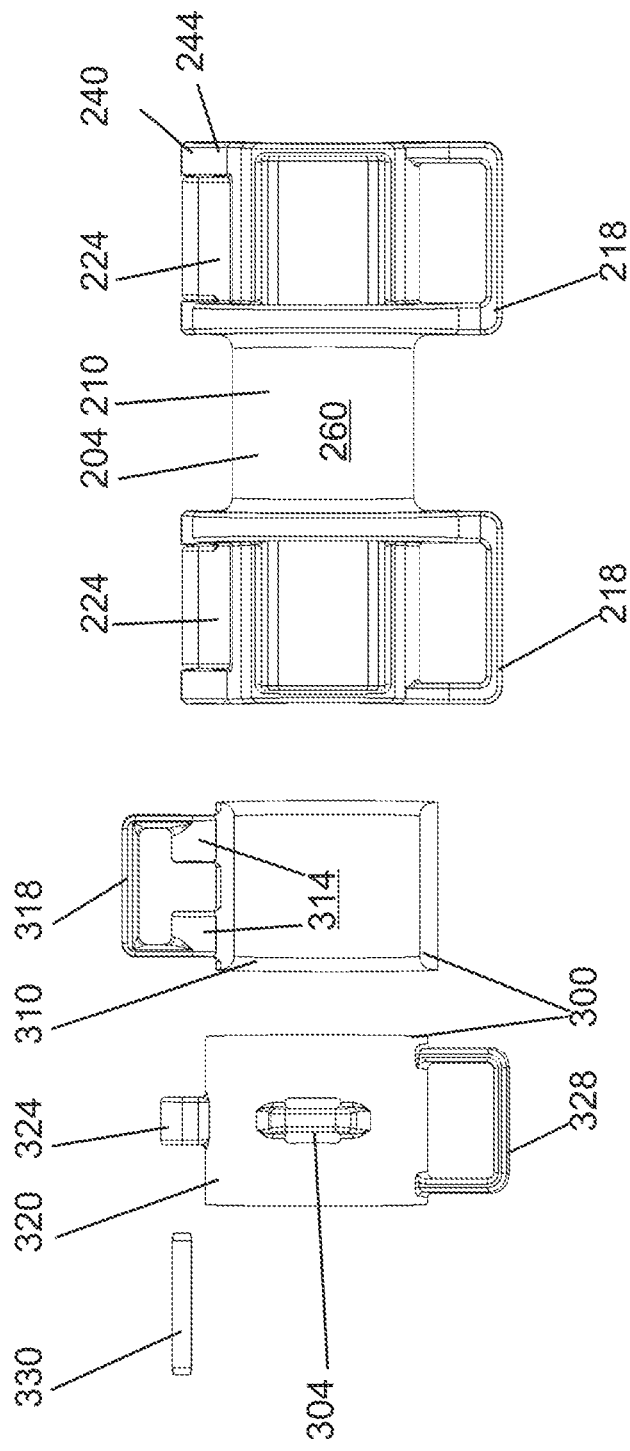
FIG. 6 is a right-side view of the latching mechanism 204 and an exploded rotating collar 300.

FIG. 6 is a right-side view of the latching mechanism 204 and an exploded rotating collar 300. The latching mechanism 204 has two halves that squeeze against pliable material 214 (FIG. 5). First half 210 has a semi-circular middle that contains pliable material 214 that is compressed against the golf club shaft 104 to hold the latching mechanism 204 in a fixed relationship with the golf club shaft 104.

First half 210 connects to second half 240 via hinge pins (not visible here) that run through hinge portions 224. Straps for tightening the latching mechanism 204 attach at one end to strap bars 218.

The latching mechanism 204 has a second half 240 which has a semi-circular middle that also contains pliable material 214 that is compressed against the golf club shaft 104 to hold the latching mechanism 204 in a fixed relationship with the golf club shaft 104.

A portion 260 of the latching mechanism 204 is adapted for receiving the rotating collar 300. The portion 260 does not have to be in the exact middle of the longitudinal axis of the latching mechanism 204 although that is a viable design choice.

Figure 7:
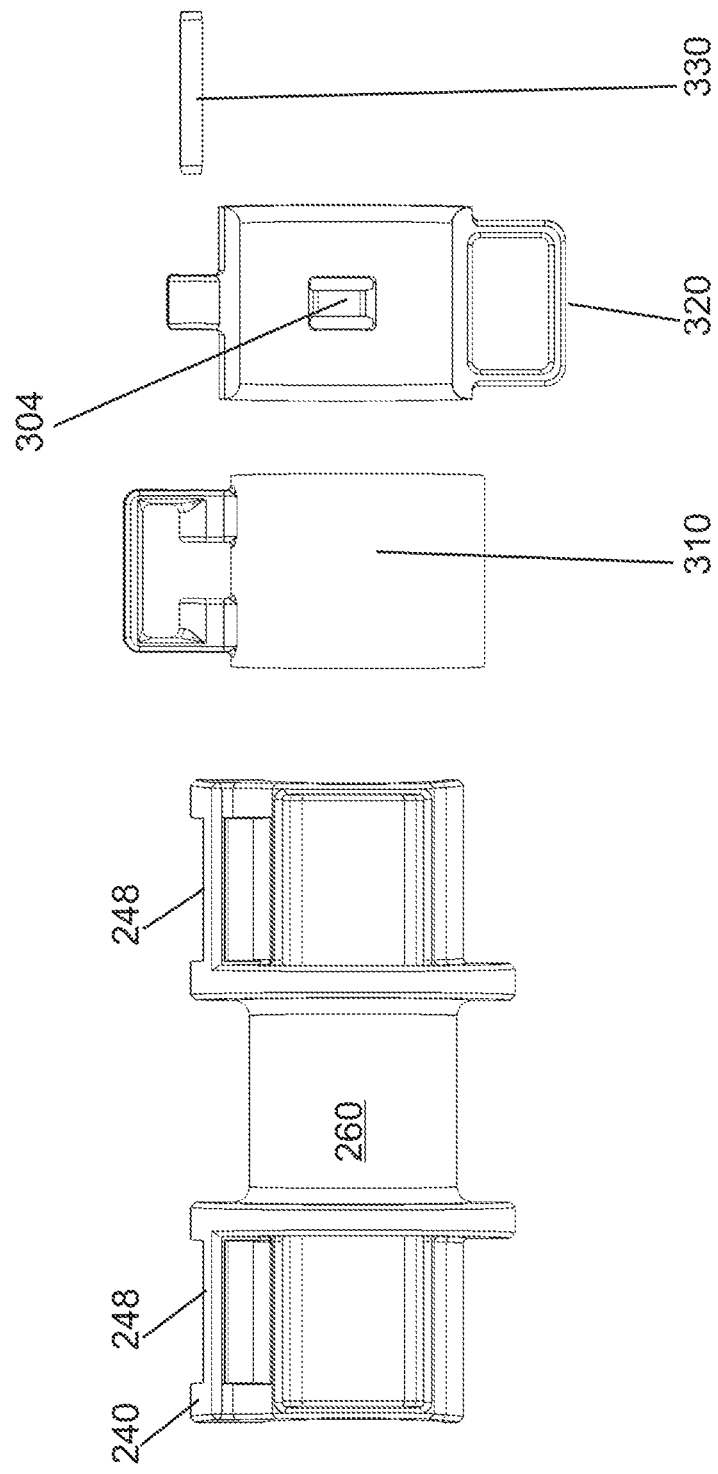
FIG. 7 shows a left side view of the second half 240 of the latching mechanism 204 and an exploded rotating collar 300.

FIG. 7 shows a left side view of the second half 240 of the latching mechanism 204 and an exploded rotating collar 300. First half 210 has been hidden to allow a better view of second half 240. Straps for tightening the latching mechanism 204 attach at one end to strap bars 248.

Visible in both FIG. 6, and FIG. 7, one can see that rotating collar 300 includes a first piece 310 and a second piece 320. In FIG. 6, one sees the concave interior of first piece 310 and the convex exterior of second piece 320. Conversely, in FIG. 7, one sees the concave interior of second piece 320 and the convex exterior of first piece 310. First piece 310 includes at least one hinge pin channel 314 and a strap bar 318 for use with a hold strap. Second piece 320 also has at least one hinge pin channel 324. Second piece 320 may have more hinge pin channels 324 than there are hinge pin channels 314. Second piece 320 may have fewer hinge pin channels 324 than there are hinge pin channels 314. Second piece 320 may have the same number of hinge pin channels 324 as there are hinge pin channels 314. Second piece 320 has a strap bar 328 for use with a hold strap that holds the rotating collar 300 on the latching mechanism 204.

Second piece 320 has an attachment port 304 that is adapted to receive a distal end 464 (FIG. 4) of a cord 460. The connection to the attachment port 304 may be through a carabiner or other quick connect mechanism. Alternatively, the distal end 464 of the cord 460 may simply be tied or otherwise engaged with the attachment port 304. There are a number of ways to engage an end of a cord with a connection anchor point and the teachings of the present disclosure are not contingent on a particular choice of how to engage the distal end 464 of the cord 460 with the rotating collar 300.

One end of first piece 310 is hinged to one end of second piece 320 through use of hinge pin 330 which engages at least hinge pin channels 314 and 324. The other ends of first piece 310 and second piece 320 are kept in proximity to one another through use of a strap that may be anchored at strap bar 318 on the first piece 310 and looped through strap bar 328 on second piece 320. The strap may use a hook and loop fastener such as is found in products marketed under the brand VELCRO®. The strap may use another fastening solution such as found in watch straps or the simple use of an adhesive.

Visible in FIG. 7 is a small opening in the concave interior of second piece 320 through which passes a portion of attachment port 304. Note that the position of hinge pin 330 (in the particular instance captured in FIG. 4) relative to components in latching mechanism 204 is arbitrary as rotating collar 300 is free to rotate freely around the latching mechanism 204 although the rotating collar 300 is substantially precluded from moving closer or further from the golf club head 108 (FIG. 4).

Figure 8:
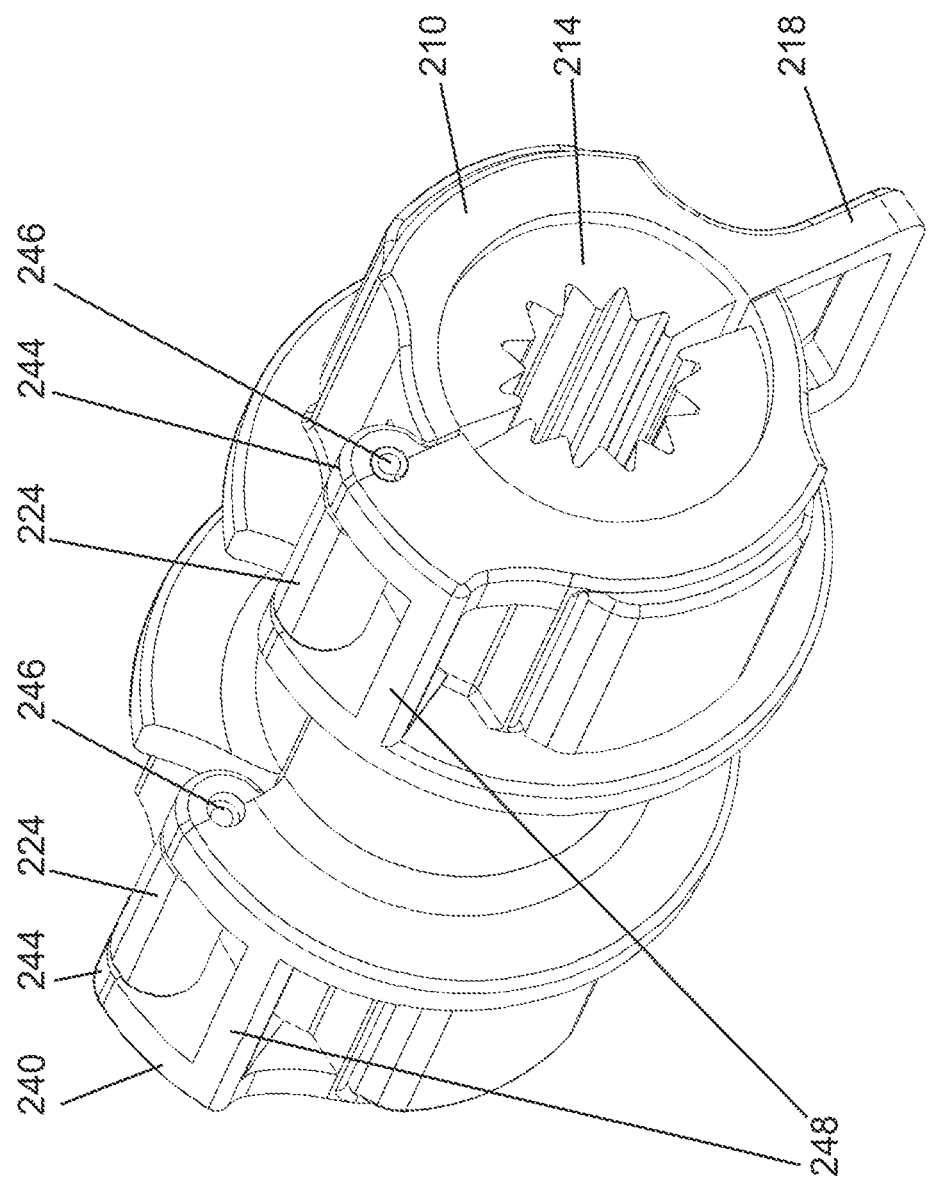
FIG. 8 is a perspective view of latching mechanism 204.

FIG. 8 is a perspective view of latching mechanism 204. Visible on first half 210 is strap bar 218 and pliable material 214. Also visible on first half 210 is hinge portion 224 which connects to hinge portions 244 on second half 240 through hinge pin 246. A pair of strap bars 248 on second half 240 are visible.

Figure 9:
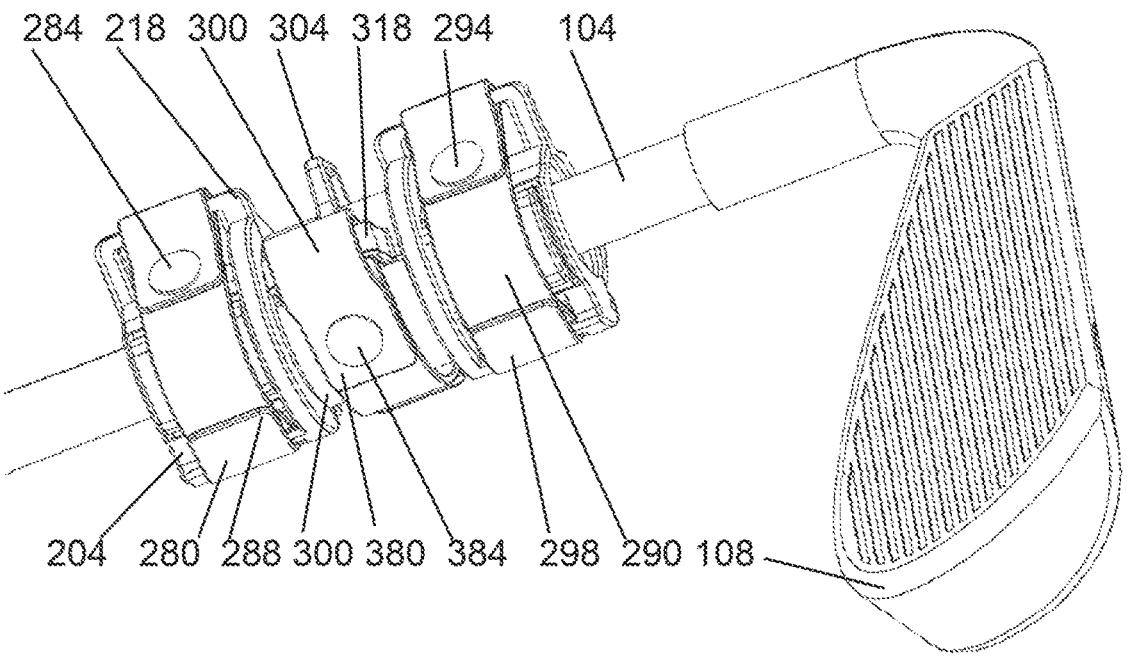
FIG. 9 shows a portion of a golf club shaft 104 with a latching mechanism 204 and rotating collar 300 installed near the golf club head 108.

FIG. 9 shows a portion of a golf club shaft 104 with a latching mechanism 204 and rotating collar 300 installed near the golf club head 108. In this particular view, one can see the straps 280 and 290 that are used to affix the latching mechanism 204 to the golf club shaft 104 and the strap 380 that is used to hold the rotating collar 300 onto the latching mechanism 204. A latching mechanism 204 installed near the golf club head 108 may be installed so that the distal end of the latching mechanism 204 is still two or three inches from the golf club head 108 as some shafts get unusually thin or unusually thick close to the golf club head 108. Depending on the shape of the golf club shaft, the closest the that the latching mechanism 204 can get to the golf club head 108 may be more than three inches but this would be a minority of the club shafts.

More particularly, strap 280 loops around strap bar 218 which is part of first half 210. The first end of the strap 280 may be affixed to the strap 280 at fixation point 284. Visible in this view is distal end 288 of strap 280 which is attached to strap 280 through a hook and loop attachment such as is found in the brand Velcro®.

Likewise, strap 290 loops around strap bar 218 which is part of first half 210. The first end of the strap 290 may be affixed to the strap 290 at fixation point 294. Visible in this view is distal end 298 of strap 290 which is attached to strap 290 through a hook and loop attachment such as is found in the brand Velcro®.

Finally, strap 380 loops through strap bar 328 on second piece 320 with the attachment port 304. A first end of strap 380 is affixed back to strap 380 at fixation point 384.

Figure 10:
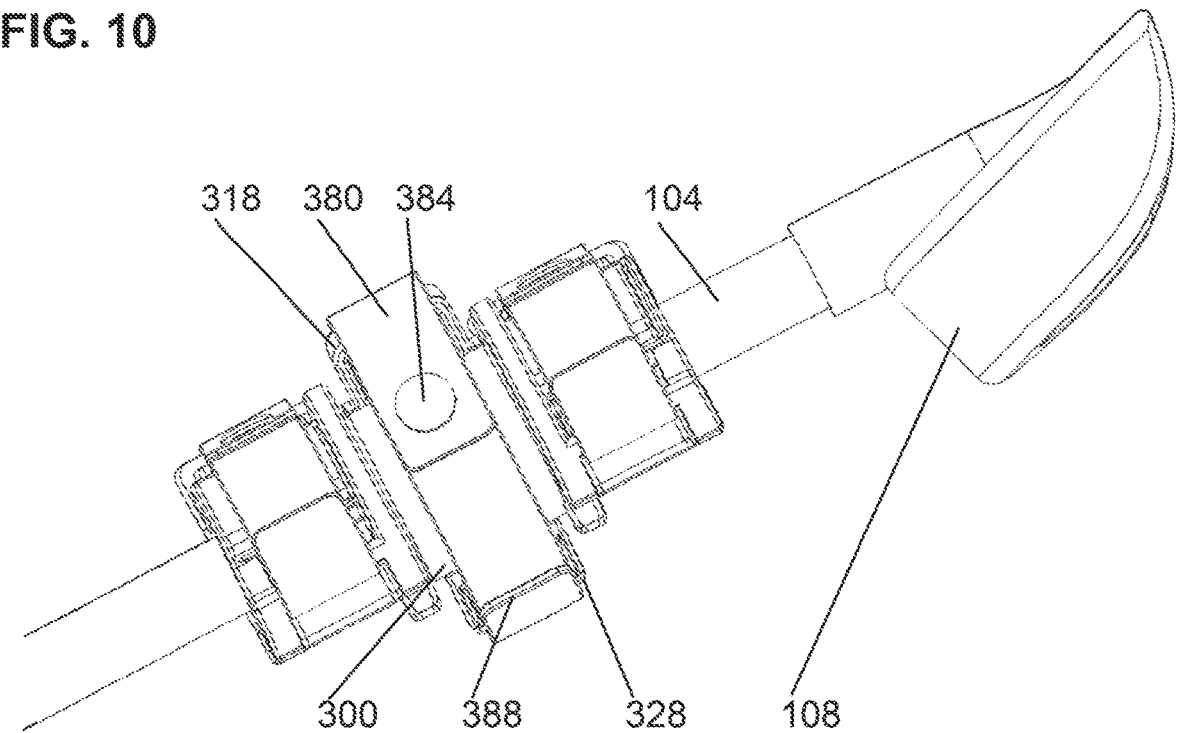
FIG. 10 is the same assembly as FIG. 9 but rotated so that the view looks at the end of the golf club head 108 furthest from the golf club shaft 104 which is visible.

FIG. 10 is the same assembly as FIG. 9 but rotated so that the view looks at the end of the golf club head 108 furthest from the golf club shaft 104 which is visible. This view was not chosen to show the golf club head 108 but was chosen in order to view more of strap 380. In this view, strap 380 loops over strap bar 318 on the first piece 310.

Figure 11:
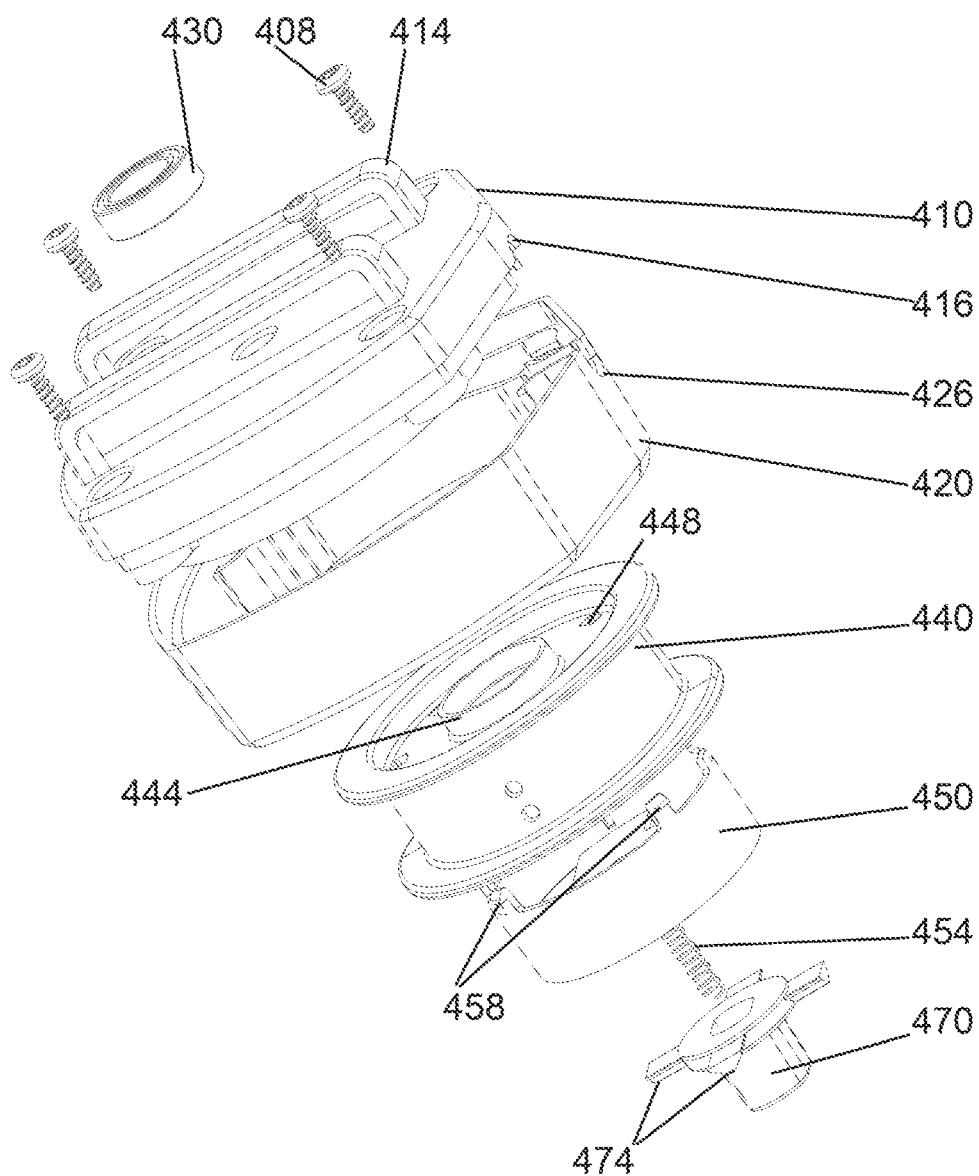
FIG. 11 is an exploded view of a particular spooling device 400.

As part of the details of an enabling disclosure, details of one particular spooling device 400 are shown in an exploded view in FIG. 11. A person of skill in the art after reviewing this present disclosure may select or modify a number of different spooling devices in order to provide audible feedback during the forward stroke of a golf swing in accordance with the present disclosure. In FIG. 11, spooling device 400 has a strap side housing 410 with at least one strap anchor 414. The strap side housing 410 is attached to the opposite housing 420 through a set of screws 408 that engage screw bores in opposite housing 420 as is known in the art. Cord 460 (not shown in this CAD model) enters into the interior of spooling device 400 through openings 416 and 426. A power spring (sometimes called a clock spring) is wound as cord 460 is retracted from the spooling device 400. The energy in the wound power spring causes the cord 460 to retract as the distal end 464 of the cord 460 gets closer to the spooling device 400 during the backswing.

Figure 12:
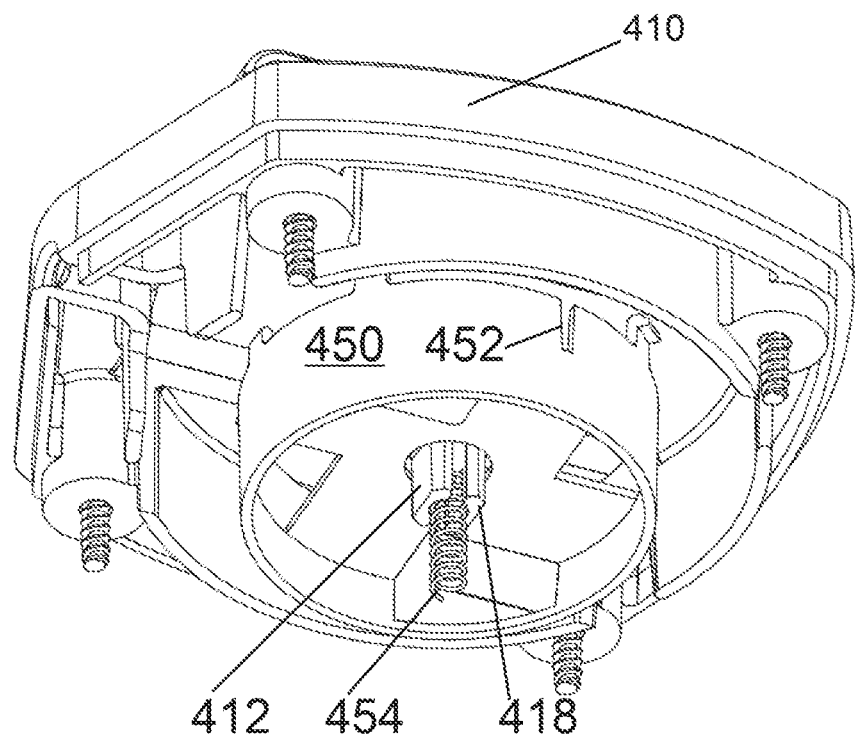
FIG. 12 shows a perspective view of the spooling device 400 from the side away from the arm band 480 with a number of components made invisible in order to see interior interrelationships.

FIG. 12 shows a perspective view of the spooling device 400 from the side away from the arm band 480 (FIG. 4) with a number of components made invisible in order to see interior interrelationships. The side away from the arm band 480 of the strap side housing 410 is visible and exposes a two-component center post 412, 418. The two-component center post 412 and 418 engages with a center portion of the power spring held within the spring carrier 450. An outer end of the power spring is captured in spring slot 452 in the spring carrier 450. Thus as the spring carrier 450 rotates relative to the two-component center post 412, 418, during release of cord from the spool, energy is added to wind the power spring.

Figure 13:
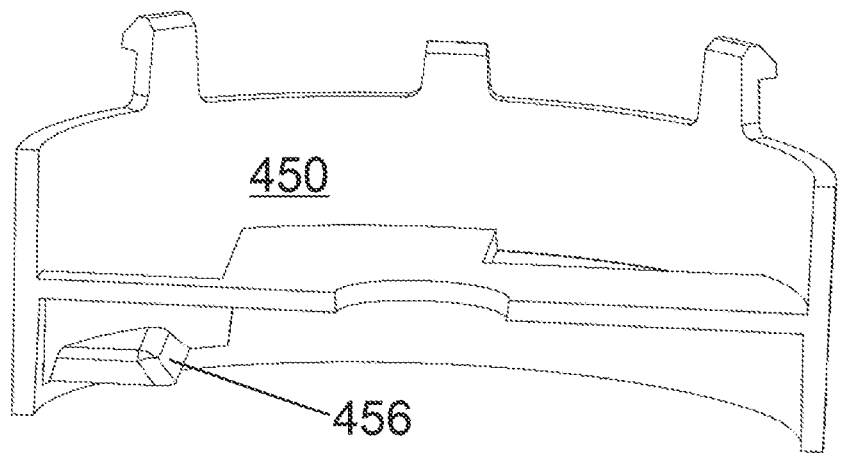
FIG. 13 is a cross section of spring carrier 450 and includes a view of one of the lifter mounds 456.

FIG. 11 includes bearing 430, spool 440, spring carrier 450, compression spring 454, and button 470. Button 470 has a set of lifter wings 474 that interact with lifter mounds 456 within the spring carrier 450 (FIG. 13 discussed below). Those of skill in the art will appreciate that the opposite housing 420 might be shown as the bottom piece in the exploded drawing but was not placed there by this exploded diagram. Likewise, those of skill in the art appreciate that the bearing 430 would be located below the strap side housing 410 and rest inside bearing holder 444 in the top of the spool 440. Spring carrier 450 has a set of tabs 458 that hold the spring carrier 450 to spool 440 using the tab slots 448 so that the spring carrier 450 rotates with the spool 440 as cord 460 is moved into or out of the spooling device 400.

FIG. 13 is a cross section of spring carrier 450 and includes a view of one of the lifter mounds 456. Button 470 does not spin but can move up and down relative to a centerline of the opposite housing 420. Button 470 is lifted and then forced back as the rotation of the spring carrier 450 causes the lifter mounds 456 within the spring carrier 450 to get under a pair of lifter wings 474 on the button 470. This moves the button 470 away from the opposite housing 420 against the spring bias of compression spring. Once the lifter mounds 456 are no longer supporting the lifter wings 474, the compressed compression spring 454 snaps the button 470 back into contact with the opposite housing 420. This rapid movement of the button 470 ending with contact with the opposite housing 420 causes the audible sound.

While the design shown in FIG. 11 to FIG. 13 is fully functional, subsequent experimentation has found advantages in adding a flat plate of a non-polymer material to be struck by the movement of the button 470 snapping back into place. This flat plate can act as a drum to make a sound that is more audible than the same amount of movement striking a housing made of acrylic.

Process of Mounting Device to a Golf Club.

Figure 14:
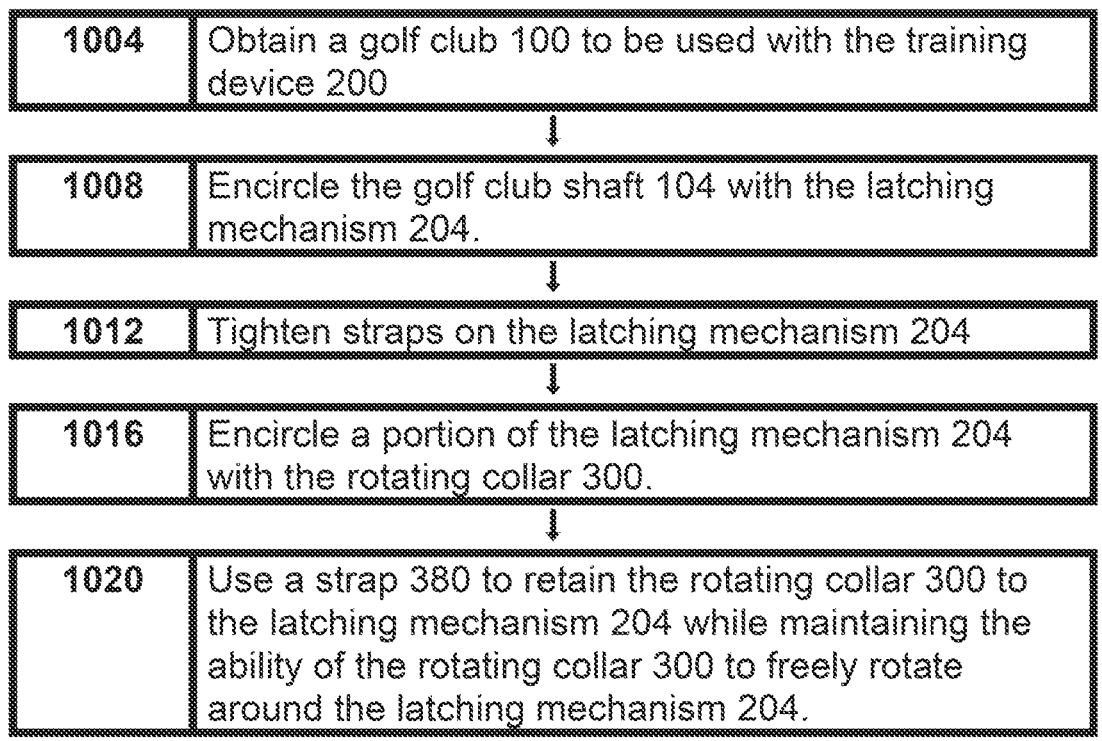
FIG. 14 shows a process 1000 for attaching a training device 200 to a golf club 100.

FIG. 14 shows a process 1000 for attaching a portion of a training device 200 to a golf club 100.

Step 1004—Obtain a golf club 100 to be used with the training device 200.

Step 1008—Encircle a portion of the golf club shaft 104 with the latching mechanism 204. More specifically, open the hinged latching mechanism 204 and place a portion of the golf club shaft 104 that is near the golf club head 108 into the first half 210 of the latching mechanism 204. Rotate the second half 240 of the latching mechanism 204 so that the golf club shaft 104 is encircled by the first half 210 and the second half 240.

One of skill in the art will appreciate that placing the latching mechanism 204 as close to the golf club head 108 as possible will increase the radius of the arc of the latching mechanism 204 as the golf club head 108 moves during the backswing and forward swing. A bigger arc means more audible sounds as the cord 460 goes through a slightly larger retraction and extension.

Step 1012—Tighten straps on the latching mechanism 204. More specifically, tighten the straps 280 and 290 on the latching mechanism 204 so that the latching mechanism 204 compresses pliable material 214 adjacent to the golf club shaft 104 to reversibly affix the latching mechanism 204 to the golf club shaft 104.

Step 1016—Encircle a portion of the latching mechanism 204 with the rotating collar 300.

Step 1020—Use a strap 380 to retain the rotating collar 300 to the latching mechanism 204 while maintaining the ability of the rotating collar 300 to freely rotate around the latching mechanism 204.

Process of Use

Figure 15:
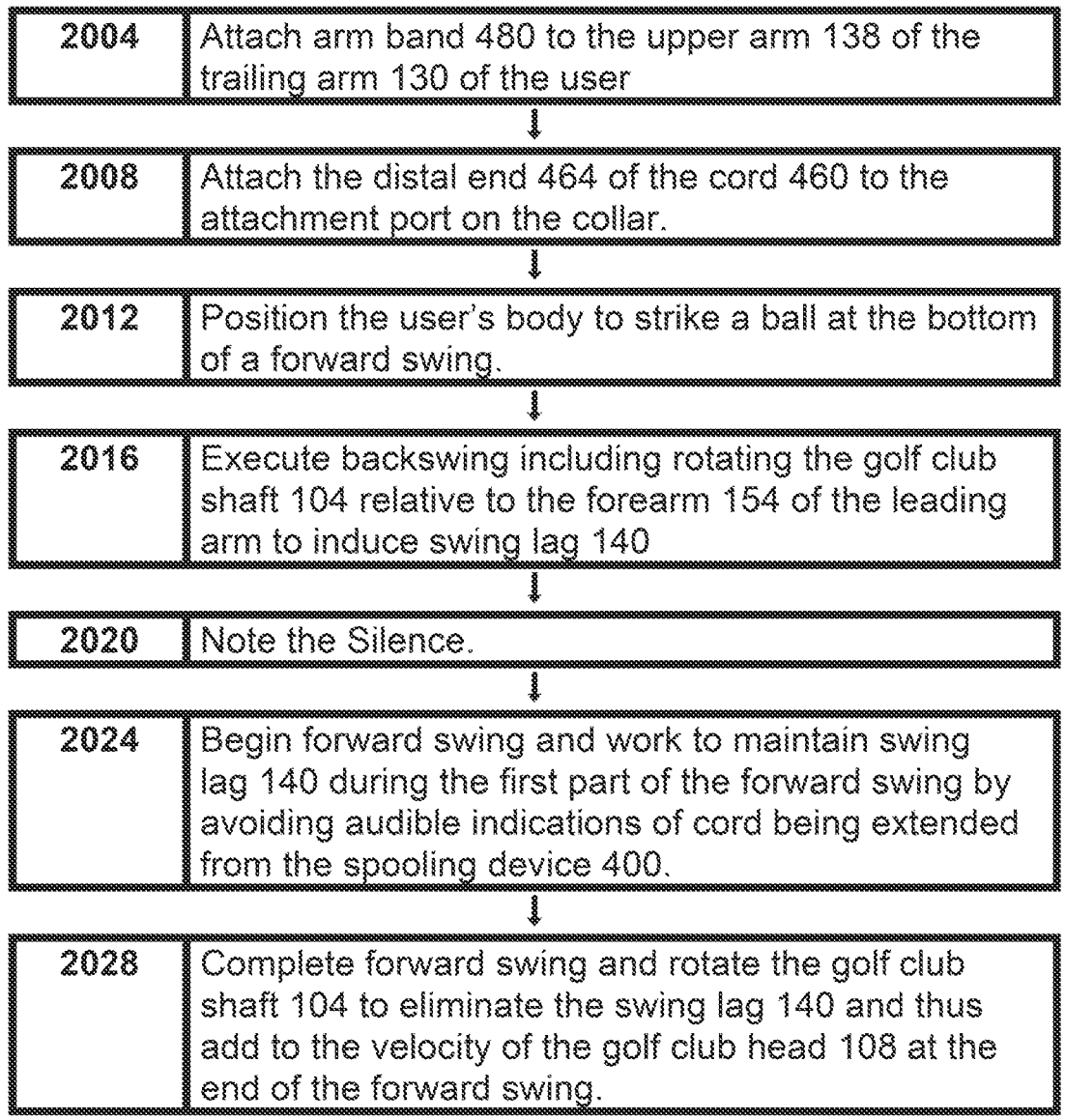
FIG. 15 contains the steps for process 2000 which is a method of using a golf club 100 with attached latching mechanism 204 and rotating collar 300.

FIG. 15 contains the steps for process 2000 which is a method of using a golf club 100 with attached latching mechanism 204 and rotating collar 300.

Figure 3:
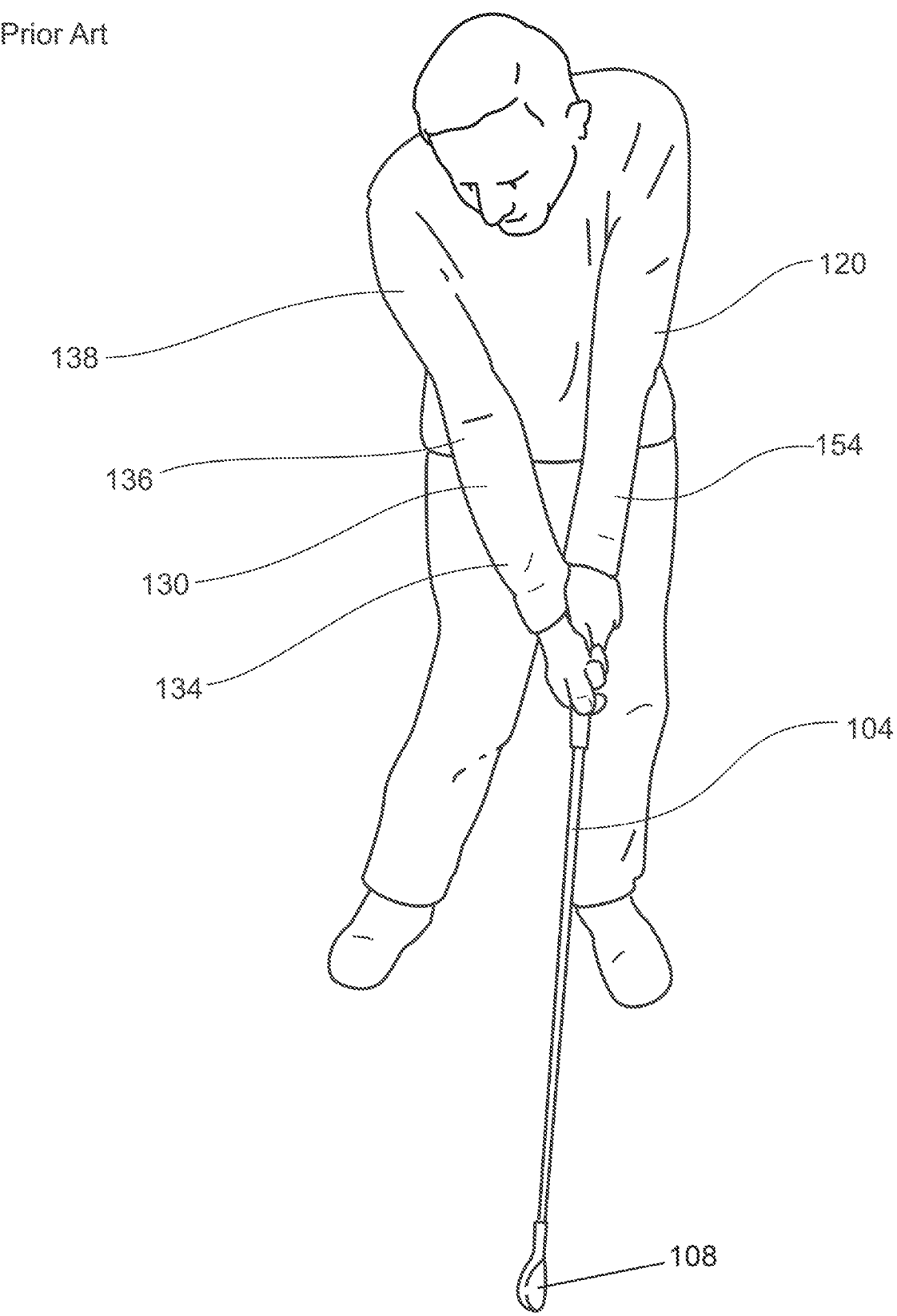
FIG. 3 shows the end of a late portion of a forward swing where the swing lag 140 is eliminated as the golf club shaft 104 is now substantially aligned with leading forearm 154 and the golf club head 108 is ready for impact with the ball (not shown).

Step 2004—Attach arm band 480 to the upper arm 138 (FIG. 3) of the trailing arm 130 (FIG. 3) of the user. More specifically, attach arm band 480 with an attached spooling device with a cord 460 (FIG. 4) of the spooling device 400 (FIG. 4) oriented towards the ground in front of the user.

Step 2008—Attach the distal end 464 of the cord 460 to the attachment port 304 (FIG. 6) on the collar. This could be attachment port 804 on the rotating collar 300 (FIG. 4, FIG. 6) or the non-rotating collar 800 described below. It could be any analogous attachment port positioned near a distal end of a shaft.

Step 2012—Position the user's body to strike a ball at an end of a forward swing. A ball does not need to be present as the user may work on improving swing lag without actually striking a ball. But the user would still align as if prepared to hit a ball at the end of the forward stroke.

Step 2016—Execute backswing including rotating the golf club shaft 104 relative to the forearm 154 of the leading arm to induce swing lag 140. The swing lag 140 may be on the order of magnitude of 90 degrees between the golf club shaft 104 and an extended line coming from the forearm 154. Some golfers achieve more than 90 degrees of swing lag 140. During the backswing, the distance between the attachment port 304 (FIG. 4) on the on the rotating collar (FIG. 4) and the spooling device 400 (FIG. 4) is decreased and the spooling device 400 winds in the excess cord 460. The spooling device 400 may emit audible clicks or other sounds as the cord 460 is retracted into the spooling device 400.

Step 2020—Note the Silence. At the top of the backswing and just before the forward swing, there is no movement of the attachment port 304 relative to the spooling device 400 and there is a brief moment of silence even if there were audible sounds while the cord 460 was being retracted into the spooling device 400.

Step 2024—Begin forward swing and work to maintain swing lag 140 during the first part of the forward swing by avoiding audible indications of cord being extended from the spooling device 400. More specifically, the user working to maintain swing lag 140 (FIG. 1) will attempt to avoid drawing cord 460 from the spooling device 400 with the aid of audible feedback from the spooling device 400.

Step 2028—Complete forward swing and rotate the golf club shaft 104 to eliminate the swing lag 140 and thus add to the velocity of the golf club head 108 at the end of the forward swing. During the completion of the forward swing, there will be a number of audible indications of cord 460 coming out of the spooling device 400 as the swing lag 140 is converted into club head speed.

Non-Rotating Collar

FIG. 7 illustrated a latching mechanism 204 and rotating collar 300 that allowed the attachment port 304 to rotate around at least a portion of the golf club shaft 104. This remains a viable solution.

Figure 16:
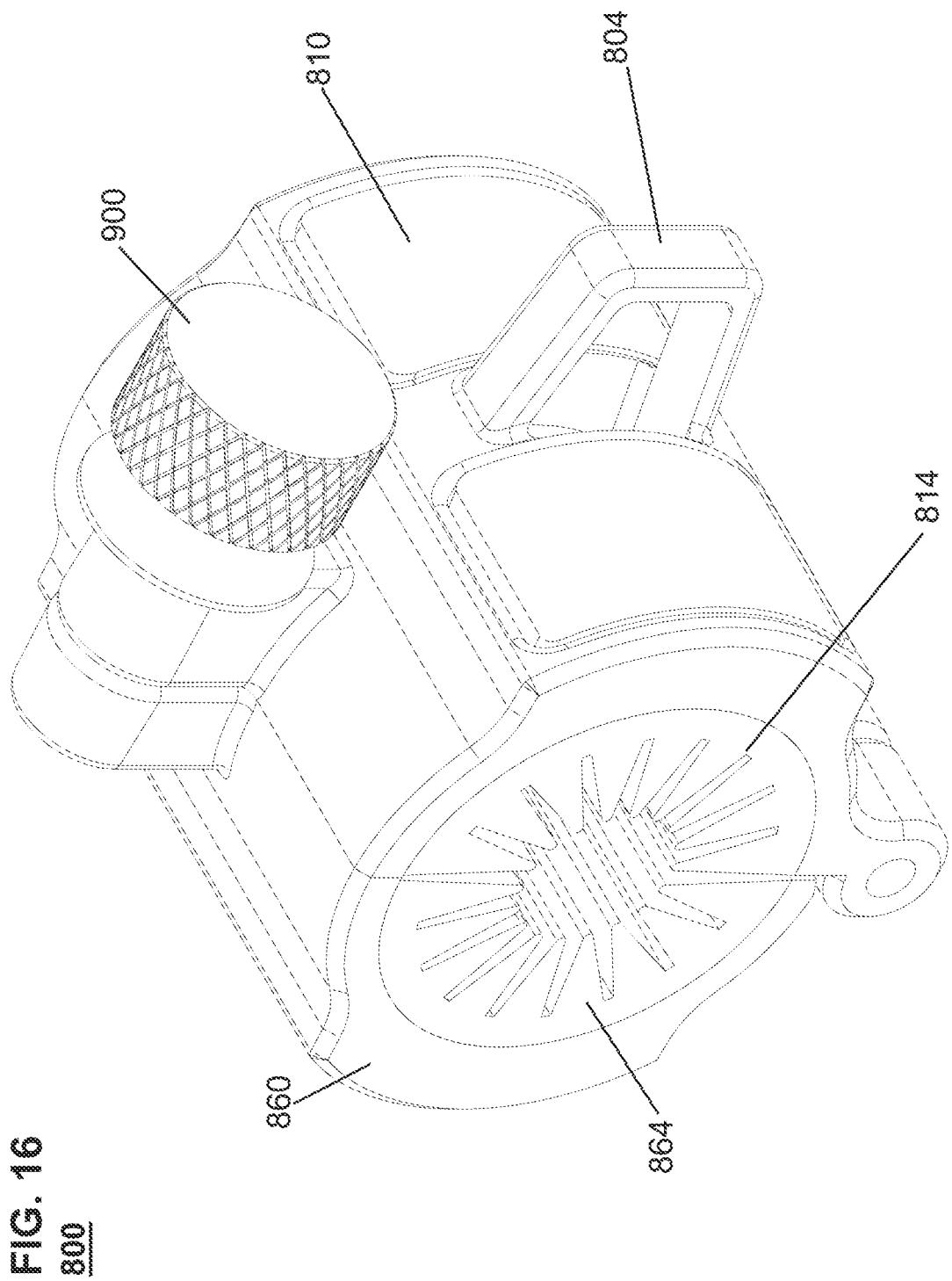
FIG. 16 is a top front right perspective view of collar 800.

Another viable solution with fewer parts to manufacture is shown in FIG. 16 with a variation that replaced latching mechanism 204 and rotating collar 300. In FIG. 16, collar 800 has a first half 810 with attachment port 804 and a second half 860 joined by a hinge pin (not shown here) and a thumb screw 900. The first half 810 has pliable material 814 and the second half 860 has pliable material 864. A thread on the distal end of the thumb screw 900 engages with a female thread in the second half 860 to rotate the first half 810 around the hinge pin to decrease the space between the first half 810 and the second half 860 to as press the pliable material 814 and pliable material 864 against an entrapped golf club shaft to bind the collar 800 to the golf club shaft without marring the golf club shaft. A careful observer will note that after placement of collar 800, attachment port 804 is fixed relative to the golf club shaft 104.

Figure 17:
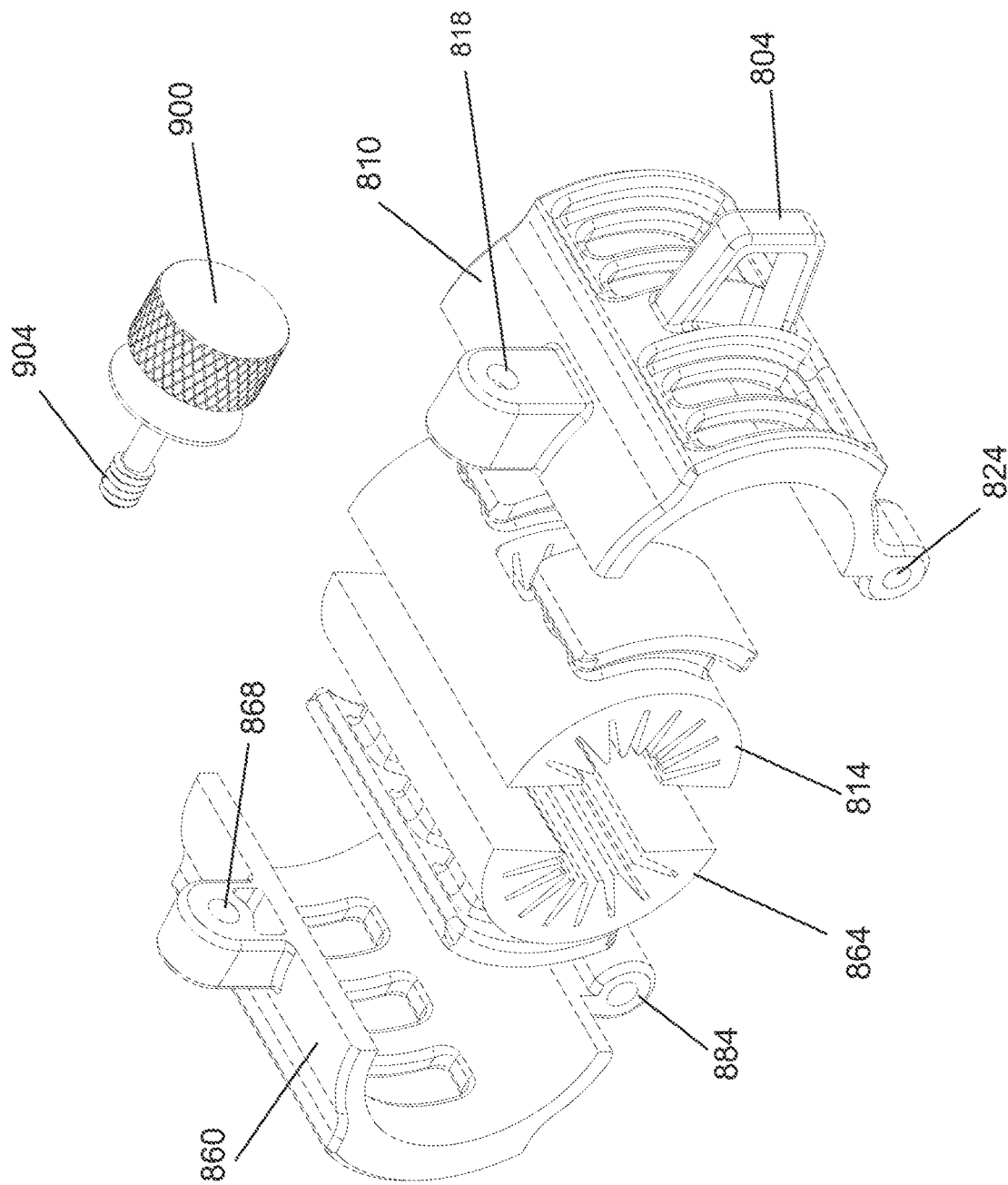
FIG. 17 provides a top front perspective exploded view of the components of the collar 800.

FIG. 17 provides a top front perspective exploded view of the components of the collar 800. First half 810 has attachment port 804, hinge pin channels 824, and thumb screw channel 818.

Second half 860 has hinge pin channels 884 which interleave with hinge pin channels 824 and engage with a hinge pin (not shown here) to form a hinge. Second half 860 has a thumb screw bore 868 which has a female thread to receive the male thread 904 on the distal end of the thumb screw 900.

Figure 18:
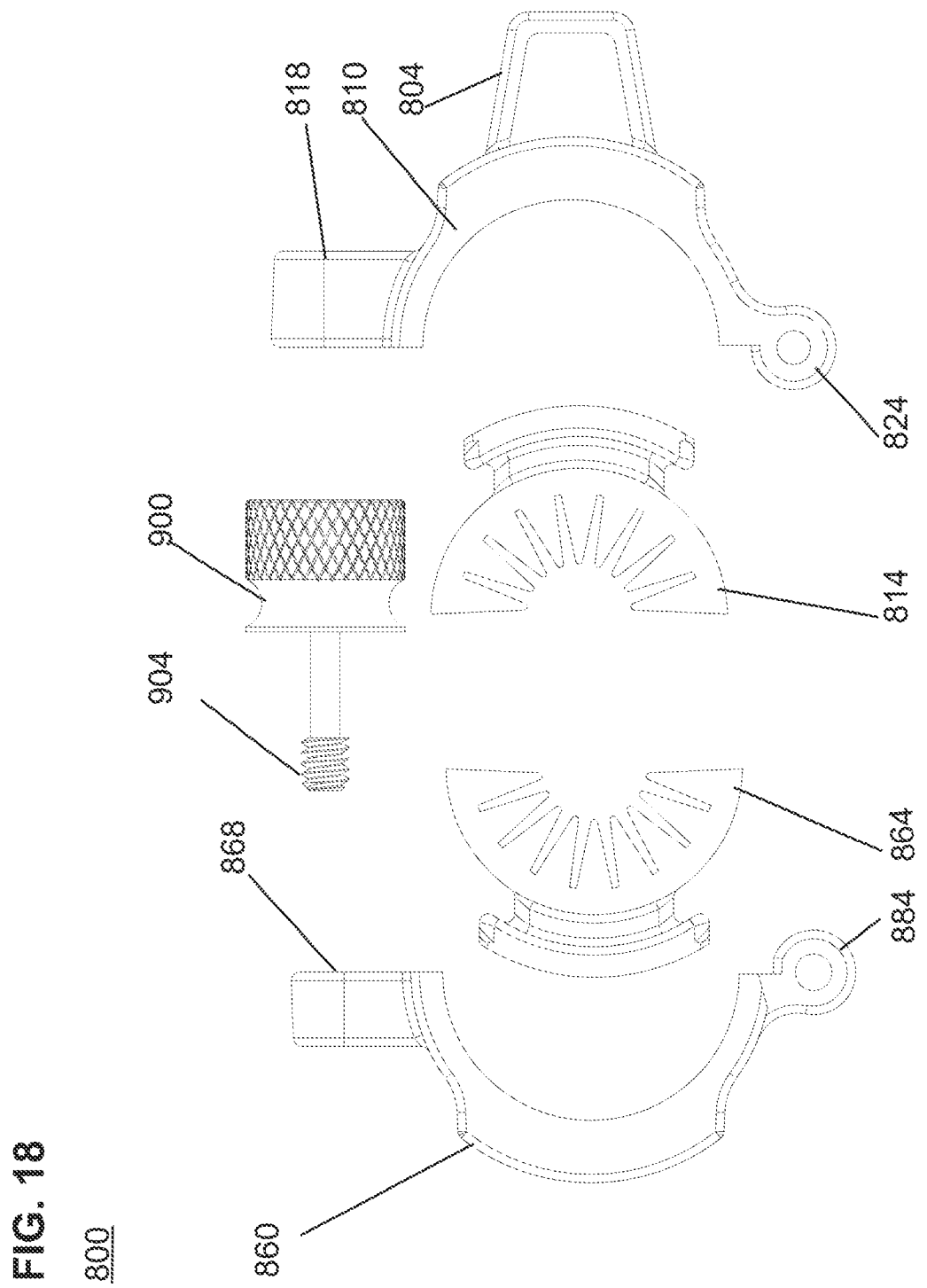
FIG. 18 provides a front plan explode view of an arrangement of the set of components described in FIG. 17.

FIG. 18 provides a front plan explode view of an arrangement of the set of components described in FIG. 17. This view is provided to give another view and not to introduce any new components. Visible in FIG. 18 is second half 860 which has thumb screw bore 868, and hinge pin channel 884. First half 810 has attachment port 804, hinge pin channel 824, and thumb screw channel 818. Thumb screw 900 with male thread 904 is shown above pliable material 814 and pliable material 864.

Figure 19:
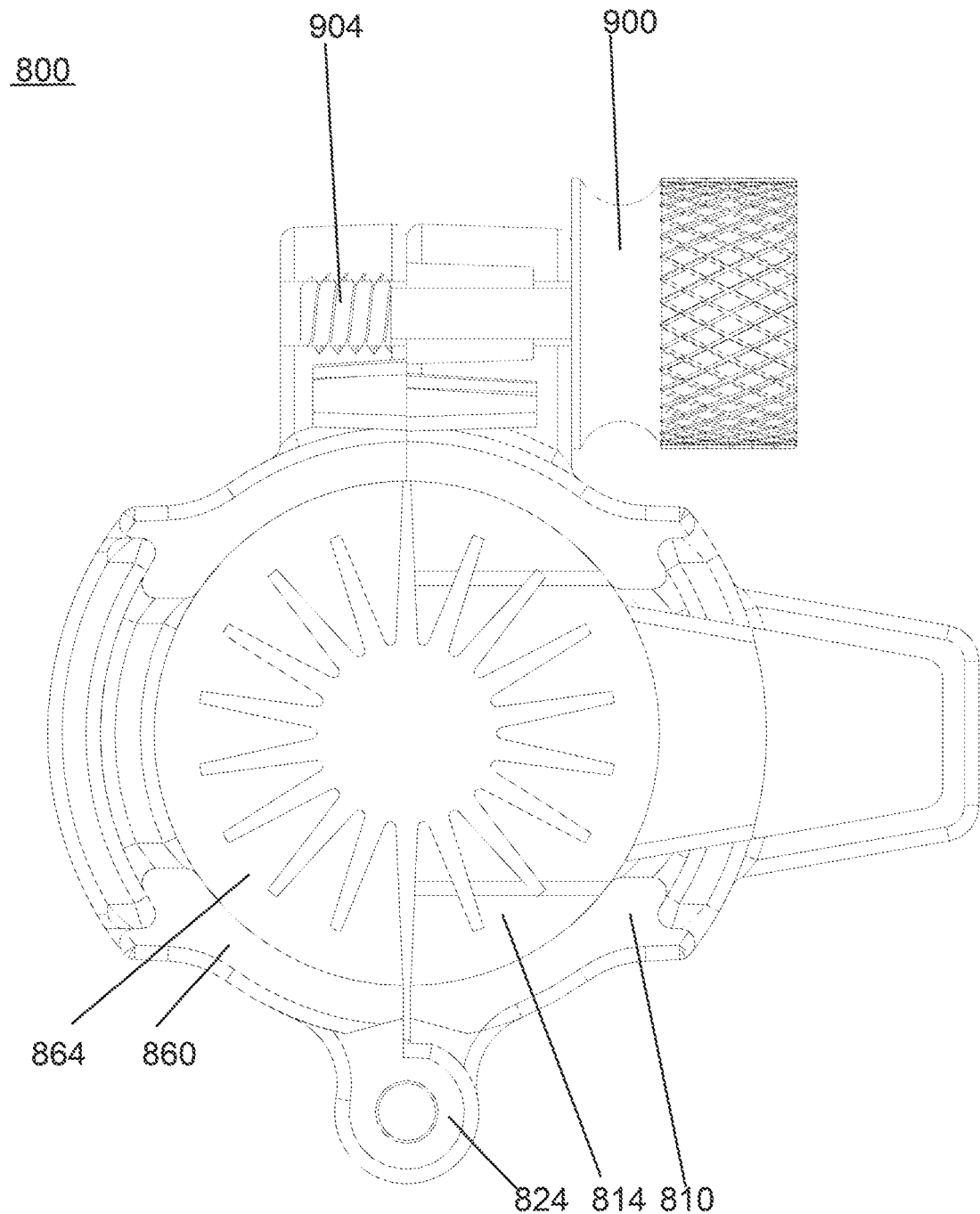
FIG. 19 provides a cross section of FIG. 16.

FIG. 19 provides a cross section of FIG. 16. FIG. 19 provides an illustration of how male thread 904 on thumb screw 900 may be used to pull first half 810 towards second half 860 around the hinge made from hinge pin channels 884 which interleave with hinge pin channels 824 and engage with a hinge pin (not shown here) to compress pliable material 814 and pliable material 864 against an entrapped golf club shaft (not shown here).

Mounting the Collar on the Club

Figure 20:
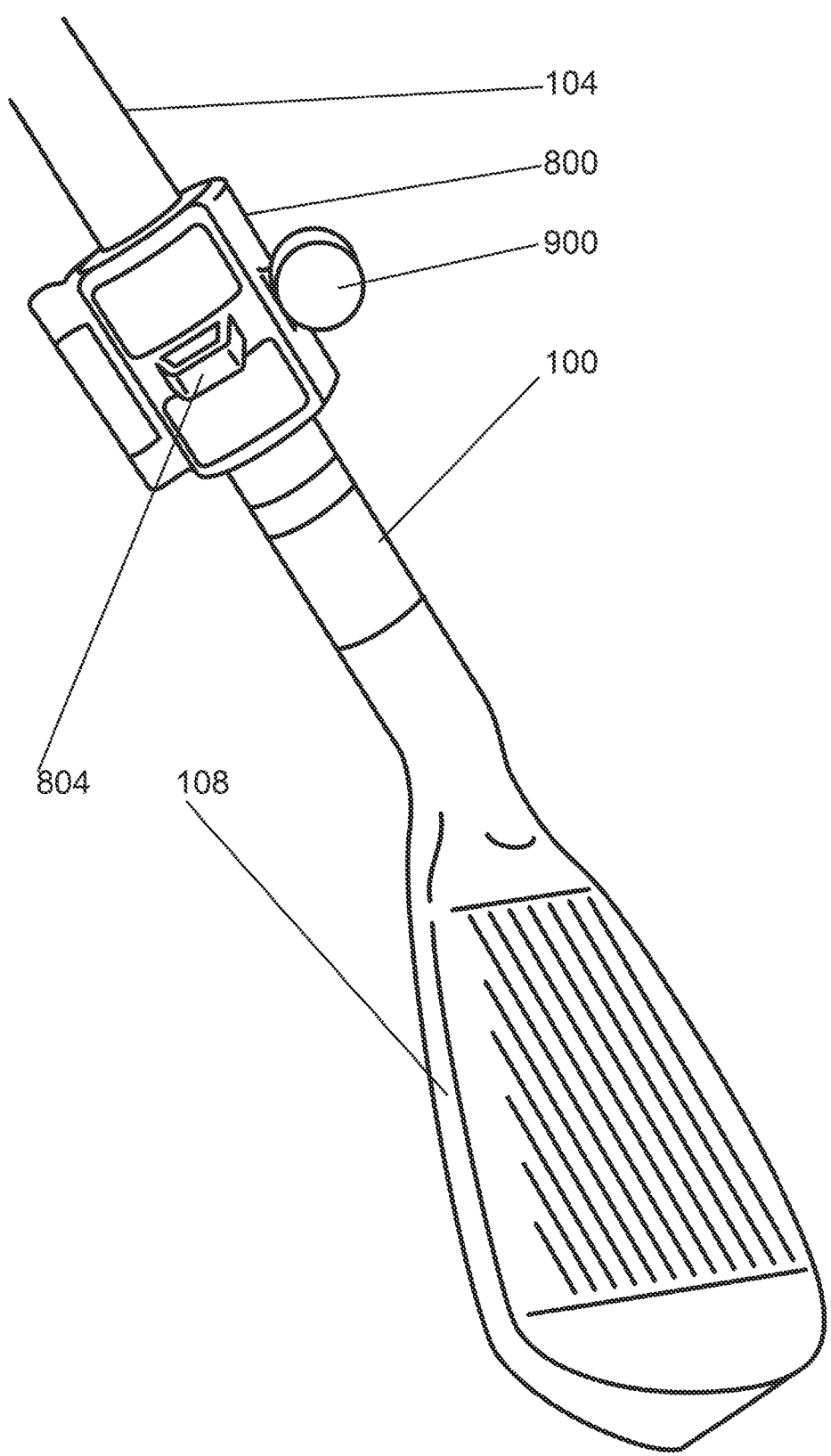
FIG. 20 shows a collar 800 mounted on a golf club 100.

The process 1000 set forth in FIG. 14 for applying the latching mechanism 204 (FIG. 6) and rotating collar 300 (FIG. 6) to a golf club 100 is sufficiently simple with the non-rotating collar 800 that a flow chart is not required. The non-rotating collar 800 may be applied to a golf club 100 on the golf club shaft 104 ideally as close as possible to the golf club head 108. Often this will be abutting the golf club hosel which is a socket that receives the golf club shaft 104. The non-rotating collar 800 is closed around the hinge and then the thumb screw 900 is used to advance the male thread 904 (FIG. 19) in the thumb screw bore 868 (FIG. 17) in the second half 860 to press the pliable material 864 and 814 against the golf club shaft 104. Before attachment port 804 is adjusted to be on the top of the golf club shaft 104 before final tightening of the thumb screw 900 as shown in FIG. 20. Those of skill in the art will appreciate that there is some tolerance in the placement of the non-rotating collar 800 and deviations of plus or minus 30 degrees from the top of the shaft would be acceptable and greater deviations would be tolerable. A user would exercise common sense and place the attachment port 804 in accordance with the instructions provided with the training device or naturally seek to avoid placing unnecessary strain on the cord 460 (FIG. 4) when the cord 460 is connected between the attachment port 804 and the spooling device 400 (FIG. 4).

The process 2000 of using the golf club with the training aid set forth in FIG. 15 is unchanged except that the attachment port used is attachment port 804 on collar 800.

Alternatives and Variations

Slot Rather than Rotating Collar.

One of skill in the art will appreciate that while use of a rotating collar 300 that allows that attachment port 304 unlimited rotation around the latching mechanism 204 is a viable solution, this is not strictly required. One could replace the use of a freely rotating collar 300 with a port slot (not shown) that is integrated into the latching mechanism 204 or strapped on much like the rotating collar 300 is strapped on. By making the modified latching mechanism the component that connects to the attachment port, the latching mechanism becomes a collar as the collar is the component that has the attachment port. The attachment port 304 would be connected to the port slot and constrained to rotate around the latching mechanism 204 for some range of less than 360 degrees. For example, the port slot could be sized to allow attachment port 304 to rotate approximately 180 degrees around the latching mechanism 204 which would allow the attachment port 304 to move as needed during the backswing and forward swing without impeding the movement of the golf club 100. One of skill in the art will appreciate that a rotating collar 300 that freely rotates may be a preferred solution as there is no need to center the port slot on a particular portion of the golf club shaft 104. In other words, having a rotating collar 300 removes a possible source of error during the attachment of the device to the golf club shaft 104. However, experience has shown that this risk of error is small as users generally understand the need to align the attachment port with the direction that the cord will travel.

Thus, a means for allowing a attachment port to rotate relative to the reversibly attached latching mechanism would include:

Rotating collar 300 as described in this disclosure; and

A latching mechanism that includes a slot to allow movement of the distal end of the cord relative to the golf club shaft 104.

Speaker that Gives Audible Feedback Rather than Mechanical Clicks.

One of skill in the art will recognize that there are many ways that pulling a cord out of a device could be used to deliver audible feedback. This could include clicks, striking of a small bell, or the use of sensors to detect the movement and trigger the delivery of sounds from a speaker. The teachings of the present disclosure are not linked to the precise type of sound that is made. Only that sound is produced on at least the forward stroke as cord is withdrawn from the spooling device 400 so as to provide feedback to help a user learn to maintain swing lag 140 until late in the forward swing.

Straps.

One viable solution for the various straps mentioned above are the use of Velcro® brand hook and loop fasteners to select a size for a strap. One of skill in the art could use other devices rather than a strap using Velcro® brand hook and loop fasteners.

Examples include using a watch band or belt type band. The belt could be braided to allow a greater range of positions to interact with the buckle. Many different mechanisms have been used to adjust the length of a belt or a watch band.

A rubber band could be used if the band is appropriately sized to allow the band to expand for placement and then provide a suitable amount of compression.

An adhesive tape or a self-amalgamating tape could be used to connect the latching mechanism to the golf club shaft. Self-amalgamating tape is a non-tacky silicone-rubber tape which can be stretched and wrapped around an item to fuse into a strong layer that provides compression. Many people are familiar with the self-amalgamating tape sold under the brand name of Rescue Tape™. Use of a tape to connect the latching mechanism may result in a need to cut the tape in order to remove the latching mechanism from the golf club shaft. For purposes of this disclosure, attaching one item to another through the use of tape and then cutting the tape to detach the item from the other is a reversible attachment as neither the one item nor the other is damaged by this cycle of events.

Not Just Golf Clubs.

The teachings of the present disclosure may be applied to enhancing swing lag in the swinging of a broad range of implements, not just golf clubs. The implement may be a golf club but could also be many other objects such as a baseball bat, softball bat, a hockey stick, a lacrosse stick, and other items used in sports. As noted below, the implement may be one that is commonly held in one hand such as a tennis racket. The implement may be a tool swung by the users such as a scythe or an axe or another tool that is used to apply impact to a work piece to alter the work piece just as an axe alters the wood at the point of contact.

Placement of the Latching Mechanism

As noted above-one of skill in the art will appreciate that placing the latching mechanism 204 as close to the golf club head 108 as possible will increase the radius of the arc of the latching mechanism 204 as the golf club head 108 moves during the backswing and forward swing. A bigger arc means more audible sounds as the cord 460 goes through a slightly larger retraction and extension.

While placement of the latching mechanism 204 within a few inches of the golf club head 108 or distal end of another implement is desirable, it is not absolutely necessary in order to enjoy benefits from the teachings of the present disclosure. One could place the latching mechanism very close to the one or two hands holding the golf club or other implement.

One-Handed Swings.

While the discussion above has centered on two-handed swings, one of skill in the art can extend the present disclosure for use in enhancing swing lag in one-handed swings. In a one-handed swing the same arm is both the leading arm and the trailing arm. One-handed swings would include golf swings by golfers that have only one arm or one-handed swings by a two-handed golfer as part of a training regime. One-handed swings would include training to use a fly-fishing pole. One-handed swings would include swinging a sports implement such as a tennis racket.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A training device to help develop swing lag for a golf swing, the training device comprising:
    a collar with an attachment port for reversible attachment to a golf club shaft of a golf club so that the collar does not allow relative motion between a reversibly attached collar and the golf club shaft;
    an arm band for attachment above an elbow of an arm of a user;
    a spooling device attached to the arm band with a cord that connects the spooling device to the attachment port on the golf club shaft; and
    the spooling device adapted to:
    retract cord into the spooling device as a golf club head is moved during a back swing and a distance between the attachment port and the spooling device is decreased; and
    provide a set of audible sounds as cord is unwound from the spooling device as the golf club head is moved in a forward swing after the back swing so that a user can train to concentrate the set of audible sounds in a late portion of the forward swing as the golf club head approaches an end of the forward swing and thus maintain swing lag during an early portion of the forward swing in order to increase leverage during impact of the golf club head with a golf ball later in the forward swing.

2. The training device of claim 1 wherein the collar with the attachment port for reversible attachment to the golf club shaft is adapted for placement near the golf club head of the golf club.

3. The training device of claim 1 wherein the collar with the attachment port for reversible attachment to the golf club shaft includes pliable material that contacts the golf club shaft such that compression of the pliable material precludes relative motion between the collar and the golf club shaft but avoids damage to the golf club shaft.

4. The training device of claim 1 wherein the spooling device is also adapted to provide a second set of audible sounds as the cord is wound into the spooling device as the golf club head is moved in the back swing.

5. The training device of claim 1 wherein the attachment port is free to rotate at least partially around the golf club shaft as the attachment port is engaged with a port slot.

6. The training device of claim 1 wherein the attachment port has a fixed position on the collar and thus is in a fixed position relative to the golf club shaft once the collar is reversible attached to the golf club shaft.

7. A method of working to enhance swing lag for a golf stroke by using a golf club shaft of a golf club with a reversibly attached attachment port, the method comprising:
    attaching an arm band to an upper arm of a user wherein the arm band has a spooling device attached to the arm band, with a first end of a cord attached to the spooling device and a distal end of the cord that is moveable relative to the spooling device such that a spool within the spooling device releases cord as the distal end of the cord moves away from the spooling device and retracts cord as the distal end of the cord moves towards the spooling device; and wherein the arm band is positioned so that the cord can extend from the spooling device towards a portion of ground in front of the user;
    attaching the distal end of the cord to the attachment port near a golf club head;
    assuming a position suitable to strike a ball with a club head at an end of a forward swing;

executing a backswing of the golf club including rotating the golf club shaft relative to a forearm of a leading arm to induce swing lag; wherein a distance between the attachment port and the spooling device is decreased and the spooling device winds in a portion of the cord;

initiating a forward swing while working to maintain the swing lag during an early portion of the forward swing by avoiding audible indications of portions of cord being extended from the spooling device; and completing the forward swing and rotating the golf club shaft to eliminate the swing lag and thus add to a velocity of a golf club head of the golf club at an end of the forward swing.

8. The method of working to enhance swing lag for a golf stroke of claim 7 wherein the user holds the golf club with just one hand.

9. The method of working to enhance swing lag for a golf stroke of claim 7 wherein the user holds the golf club with two hands.

10. The method of working to enhance swing lag for a golf stroke of claim 7 wherein the attachment port cannot move relative to the golf club shaft.

11. The method of working to enhance swing lag for a golf stroke of claim 7 wherein the attachment port is able to rotate at least partially around the golf club shaft.

12. The method of working to enhance swing lag for a golf stroke of claim 7 wherein the attachment port is able to rotate 360 degrees around the golf club shaft.

13. A training device to help develop swing lag for swinging an implement, the implement having a proximal end held with at least one hand and a distal end, opposite the proximal end, the training device comprising:

a collar with a attachment port for reversible attachment to the implement so that the collar does not allow relative motion between a reversibly attached collar and the implement;

an arm band for attachment above an elbow on an arm of a user;

a spooling device attached to the arm band with a cord that connects the spooling device to the attachment port on the attached collar placed near the distal end of the implement;

the spooling device adapted to:

retract cord into the spooling device as the distal end of the implement is moved during a back swing and a distance between the attachment port and the spooling device is decreased; and provide a set of audible sounds as cord is unwound from the spooling device as the distal end of the implement is moved in a forward swing after the back swing so that a user can train to concentrate the set of audible sounds in a late portion of in the forward swing as the distal end of the implement approaches an end of the forward swing and thus maintain swing lag during an early portion of the forward swing in order to increase leverage during impact of the distal end of the implement later in the forward swing.

14. The training device of claim 13 wherein the implement is used to strike an object in a sport.

15. The training device of claim 14 wherein the implement is a baseball bat used to strike a baseball.

16. The training device of claim 13 wherein the implement is a tool used to strike an object in order to alter the object at a point of contact.

17. The training device of claim 13 wherein the implement is held by the user with just one hand.

18. The training device of claim 13 wherein the implement is held by the user with two hands.

19. The training device of claim 13 wherein the attachment port is free to rotate at least partially around the implement as the attachment port is engaged with a port slot.

20. The training device of claim 13 wherein the attachment port has a fixed position on the collar and thus is in a fixed position relative to the implement once the collar is reversible attached to the implement.

21. A training device to help develop swing lag for a golf swing, the training device comprising:

a latching mechanism for reversible attachment to a golf club shaft of a golf club so that the latching mechanism does not allow relative motion between a reversibly attached latching mechanism and the golf club shaft;

a rotating collar that is attached to the latching mechanism and allows for an attachment port to rotate relative to the reversibly attached latching mechanism and thus allows the attachment port to rotate at least partially around the golf club shaft;

an arm band for attachment above an elbow of an arm of a user;

a spooling device attached to the arm band with a cord that connects the spooling device to the attachment port on the golf club shaft; and the spooling device adapted to:

retract cord into the spooling device as a golf club head is moved during a back swing and a distance between the attachment port and the spooling device is decreased; and provide a set of audible sounds as cord is unwound from the spooling device as the golf club head is moved in a forward swing after the back swing so that a user can train to concentrate the set of audible sounds in a late portion of the forward swing as the golf club head approaches an end of the forward swing and thus maintain swing lag during an early portion of the forward swing in order to increase leverage during impact of the golf club head with a golf ball later in the forward swing.

\* \* \* \* \*